United States Patent [19]

Balog et al.

[11] 4,123,571
[45] Oct. 31, 1978

[54] METHOD FOR FORMING SMOOTH SELF LIMITING AND PIN HOLE FREE SIC FILMS ON SI

[75] Inventors: Moshe Balog, Jerusalem, Israel; Melvin Berkenblit, Yorktown Heights, N.Y.; See-Ark Chan, Croton-on-Hudson, N.Y.; Arnold Reisman, Yorktown Heights, N.Y.

[73] Assignee: International Business Machines Corporation, Armonk, N.Y.

[21] Appl. No.: 831,561

[22] Filed: Sep. 8, 1977

[51] Int. Cl.$^2$ .......................... B44D 1/14; B44D 1/18
[52] U.S. Cl. ...................................... 427/249; 427/93; 427/95; 427/248 A
[58] Field of Search ...................... 427/249, 248 A, 93, 427/95

[56] References Cited

U.S. PATENT DOCUMENTS 3,794,516  2/1974  Engeler et al. .................. 427/249 X

FOREIGN PATENT DOCUMENTS 1,158,637  7/1969  United Kingdom ..................... 427/249

Primary Examiner—Michael R. Lusignan
Attorney, Agent, or Firm—Hansel L. McGee

[57] ABSTRACT

The invention provides a method for forming a protective silicon carbide (SiC) film on a silicon (Si) substrate. The method permits the formation of silicon carbide on the Si substrate on all surfaces simultaneously. The process is highlighted in that the silicon substrate to be coated is placed in a susceptor having tantalum carbide surfaces and which has a high purity ambient. The substrate is heated at a temperature about 1250° C to remove native SiO$_2$ from its surface. The system is then cooled to a temperature of about 900° C and methane is added for about 30 minutes to thereby deposit a layer of carbon which is further reacted with the Si substrate at 1250° C to form a smooth, pin hole free SiC film. SiC layers are also formed by a one step reaction in which methane is reacted directly with Si at 1250° C.

12 Claims, 3 Drawing Figures

METHOD FOR FORMING SMOOTH SELF LIMITING AND PIN HOLE FREE SIC FILMS ON SI

BACKGROUND OF THE INVENTION

Silicon has played an important role in the fabrication of ink jet nozzles to be used in the ink jet printing technology (U.S. Pat. Nos. 3,921,916 to Ernest Bassous and U.S. Pat. No. 4,007,464 to Ernest Bassous et al). However, because of corrosion and erosion tendencies of the electrostatic and magnetic inks, respectively, the lifetime of Si nozzles may not be adequate from a reliability standpoint. $SiO_2$ has been employed as a protective coating, but fails to represent a complete solution to the problem. Other suggested solutions included the use of other types of thin coatings such as $Si_3N_4$, $Al_2O_3$, metals, alloys and the like. One major problem with depositing the above-mentioned thin films is their susceptibility to imperfections. Additionally, the problems of adhesion and some mismatch differences also create a problem.

In the publication entitled "In Situ Formation of Ink Jet Nozzle Protective Coatings" to J. Aboaf et al, IBM Technical Disclosure Bulletin, Vol. 18, #2, July 1975 discloses a method for passivating silicon films. It is suggested that the silicon nozzle structure is to be oxidized and then subjected to chemical vapor deposition of an organic vapor such as methane, ethane or propane and the like. The process so described therein has proven to be inadequate and the films fail to exhibit the characteristics necessary to achieve passivation of nozzles i.e. high density, pin hole free, highly adherent, smooth, stress free and chemically inert.

SUMMARY OF THE INVENTION

According to the present invention, a method for forming high density, pin hole free, highly adherent, smooth, stress free and chemically inert thin films of silicon carbide is disclosed. The method includes placing the substrate in a susceptor free of impurities, removing silicon oxide from the substrate and subjecting the substrate thereafter to the cracking of methane or other like substances which are then further reacted with the Si substrate to form SiC. In another embodiment of the invention is the provision of a susceptor that is literally free of any contaminants. The susceptor is fashioned from annealed tantalum parts which are mechanically polished and cleaned in a series of solutions. Just prior to the preparation of the silicon carbide films the susceptor is assembled in an RF reactor heated to remove oxides therefrom and is further treated with methane to obtain the formation of tantalum carbide on its walls. It is this susceptor into which the silicon substrate is placed just prior to the formation of the silicon carbide thereon.

DETAILED DESCRIPTION OF THE INVENTION

According to the present invention a thin pin hole free silicon carbide film is simultaneously deposited on all surfaces of a silicon substrate. In another embodiment of the invention there is provided a susceptor in which the silicon substrate is so coated. It should be noted that the silicon substrate can have formed on them silicon ink jet nozzles such as those described in U.S. Pat. No. 4,007,464, or other similar silicon nozzles. The coating proceeds according to the much studied reaction $Si + CH_4 = SiC + 2H_2$. The above reaction has been studied by W. G. Spitzer et al in a publication entitled, "Infrared Properties of Cubic Silicon Carbide Films," Physical Review 113 (1959) 133. They prepared data on SiC for infrared transmission and reflection measurements. H. Nakashima et al in a publication entitled "Epitaxial Growth of SiC Film on Silicon Substrate and its Crystal Structure," Japanese Journal of Applied Physics 5, 874 (1966) measured the growth layers relative to the approximate temperatures and partial pressures of $CH_4$. P. Chaudhari et al in the publication "$\beta$-Silicon Carbide Films," J. Electrochem. Soc. 116, 1440 (1969), obtain SiC films ranging from oriented single crystal to near amorphous structures. The $\beta$ SiC films were grown in a horizontal RF reactor using hydrogen or argon as a carrier gas. J. Graul et al in the publication entitled, "Growth Mechanism of Polycrystalline $\beta$-SiC Layers on Silicon Substrate," Applied Physics Letters 21, 67, (1972) prepared data on the formation of SiC as a chemical conversion of silicon with methane and investigated the mechanism by a carbon 14 tracer technique.

None of the above cited references concerned themselves with the problems that the present invention sought to solve. The purpose of the present invention is to provide a thin, passivating film i.e., preparing SiC films having high density, are pin hole free, are smooth and are stress free, there is also provided a susceptor and reactor which are highly free from contaminants and which are a necessary aspect of the invention. The susceptor is fabricated from tantalum and is coated with a thin film of tantalum carbide.

In the present invention Si substrates are reacted with methane at temperatures in the range of 1200° to 1350° C. in a horizontal RF heated reactor either directly or in a two step reaction involving an initial reaction of methane at 900° C. The reactor is demonstrated in FIG. 1, where the reactor is generally indicated as 10 and is heated by RF coils 12. Si substrates not shown are placed within susceptor 14. The susceptor 14 is placed within reactor 10 so as not to touch any surface thereof. It rests on four sapphire supports, two of which are shown by 16 and 18, and has the effect of "floating."

Figure 2:
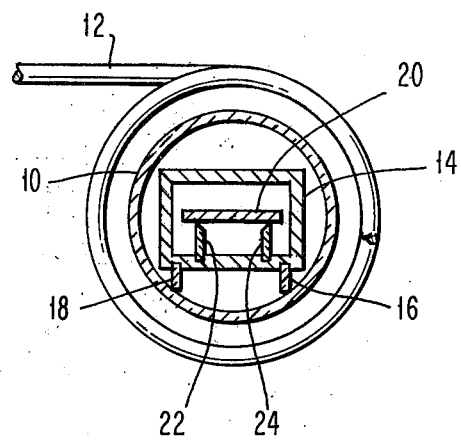
FIG. 2 is a cross sectional view of the silicon wafer in the susceptor within the reactor.

Referring to FIG. 2, the substrate 20 is placed within the susceptor 14 on a pair of sapphire supports 22 and 24 having knife edges at the point of contact with substrate 20.

Figure 3:
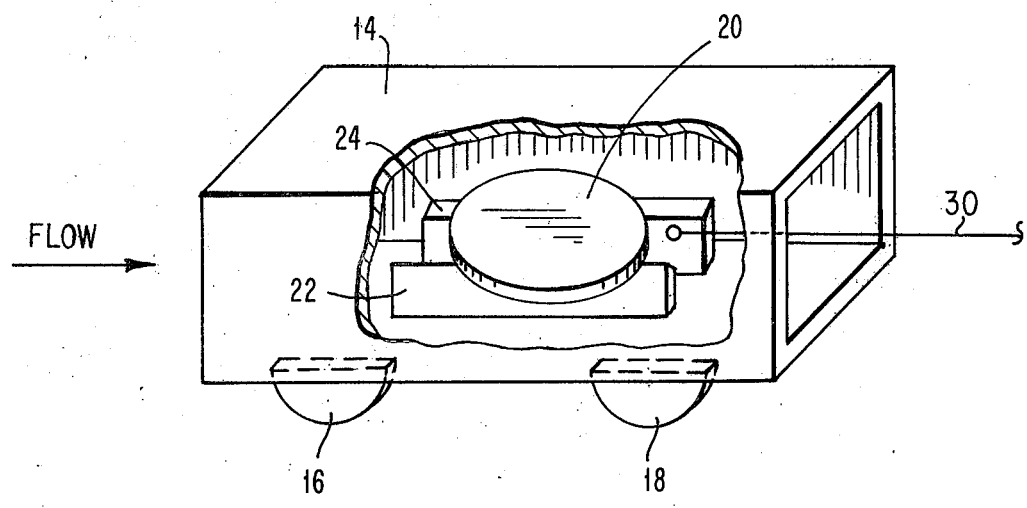
FIG. 3 is a cut away view of the susceptor having the silicon substrate therein.

FIG. 3 is a susceptor with cutout showing the placement of substrate 20 on the knife edges of support members 22 and 24 situated within susceptor 14. It is noted that susceptor 14 rests upon support members 16 and 18, so as to keep it out of immediate contact with reactor 10 not shown in FIG. 3.

Reactor 10 can be fashioned from quartz and is a conventional reactor known in the art. The susceptor 14 is fashioned from annealed tantalum which is mechanically polished and then cleaned in a series of solutions, for example, trichloroethylene, acetone, deionized water, white etch, deionized water, alcohol and dried. The tantalum susceptor parts as treated are then assembled and placed in the reactor 10 and heated slowly for approximately 1 hour to a temperature approximately 1300° C. The susceptor is then heated for 10 minutes in hydrogen to remove surface oxides. Methane is then introduced into reactor 14 and the tantalum susceptor is reacted with carbon to form tantalum carbide. The reaction occurs in about 3 hours at about 1300° C.

The choice of susceptor material and the materials used to support substrates and susceptor becomes increasingly difficult as the temperatures of the reaction increases. Particularly at temperatures above 1200° C. These materials may be sources of contamination at elevated temperatures. It has been found that graphite susceptors or SiC coated graphite susceptors evolve contaminants (to varying degrees) that react with Si substrates. Coating materials for graphite other than SiC have been examined. For example, silicon and tungsten coatings are found to crack and refractory oxides are attacked by hydrogen at elevated temperatures. Refractory metals and their associated carbides and silicides are potentially useful as susceptors. Most of them can be readily coupled to induction heated system. Some have been used such as tungsten and tungsten carbide, tantalum and tantalum silicide coated tantalum. The use of tantalum is studied in the following publications, to A. Todkill et al, Mats, Res. Bull. 4, S293–S302 (1969) "The Properties of Some SiC Electroluminescent Diodes," to S. Mindgawa et al, Jap. J. Appl. Phys. 10, 1680–90 (1971) "Epitaxial Growth of α-SiC from the Vapor Phase," and to J. M. Harris et al, J. Electrochem. Soc. 118, 335-8 (1971) "Growth Characteristics of Alpha-Silicon Carbide I. Chemical Vapor Deposition."

TaSi$_2$ coated tantalum was successfully used to reduce contaminant levels, but however had a short lifetime because of difficulties encountered in removing accumulated carbon deposits. Removing carbon from TaSi$_2$ coated Ta parts requires scraping or grinding of the carbon layer. This destroys the integrity of the coating which then requires another piece of apparatus in which to recoat the Ta parts. Whereas in the case of the TaC coated Ta, of the present invention, carbon is removed similary but can be recoated in situ. It was discovered herein that tantalum carbide coated tantalum was most suitable for purposes of this invention.

A second factor to consider in addition to the choice of the material is the geometry of the susceptor. The susceptor, as indicated in the drawings, is an open ended rectangular box made up of tantalum plates. The top and bottom plates are about 0.250 inches thick and the side walls are about 0.125 inches thick. It is very important that the susceptor is isolated from the fused quartz reactor walls, and free of any quartz supporting parts of this invention since a reaction will occur between the tantalum and the fused quartz. The susceptor is supported (floated) on sapphire. The use of a "floating," box shaped susceptor minimizes contamination, provides a more uniform temperature at the substrate, and all sides of the substrate were coated during a single reaction. The temperature of the reactor is monitored by a thermocouple.

After the above essential steps of preparing the susceptor 14 are performed, silicon wafers are cleaned in (10% or buffered) hydrofluoric acid and rinsed with deionized water and dried. The wafers 20 are then placed in susceptor 14 on the knife edges on support members 22 and 24. Before methane is introduced, the wafer(s) 20 are heated to 1250° C. in a flowing preheated helium atmosphere. This is done to remove the native oxide present on the Si substrate according to the following reaction.

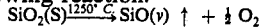
$$SiO_2(s) \xrightarrow{1250°\ C.} SiO(v) \uparrow + \tfrac{1}{2} O_2$$

The SiC reaction is then accomplished by either a one step reaction or a two step reaction. The Si substrate temperature is adjusted to 1200°–1350° C. or 900° C. corresponding respectively to a one step or two step reaction and a gas mixture (preheated) containing methane and helium is admitted into reactor 10.

Preheating of the mixed gas is necessary to minimize substrate cooling by the gases entering the susceptor, thereby achieving uniformity of substrate temperature. It is necessary to maintain a uniform substrate temperature to obtain uniform film thicknesses. This is accomplished by preheating the entering gas to a temperature below that at which methane cracks. This can be accomplished at about 600° C. or greater but less than about 800° C.

Figure 1:
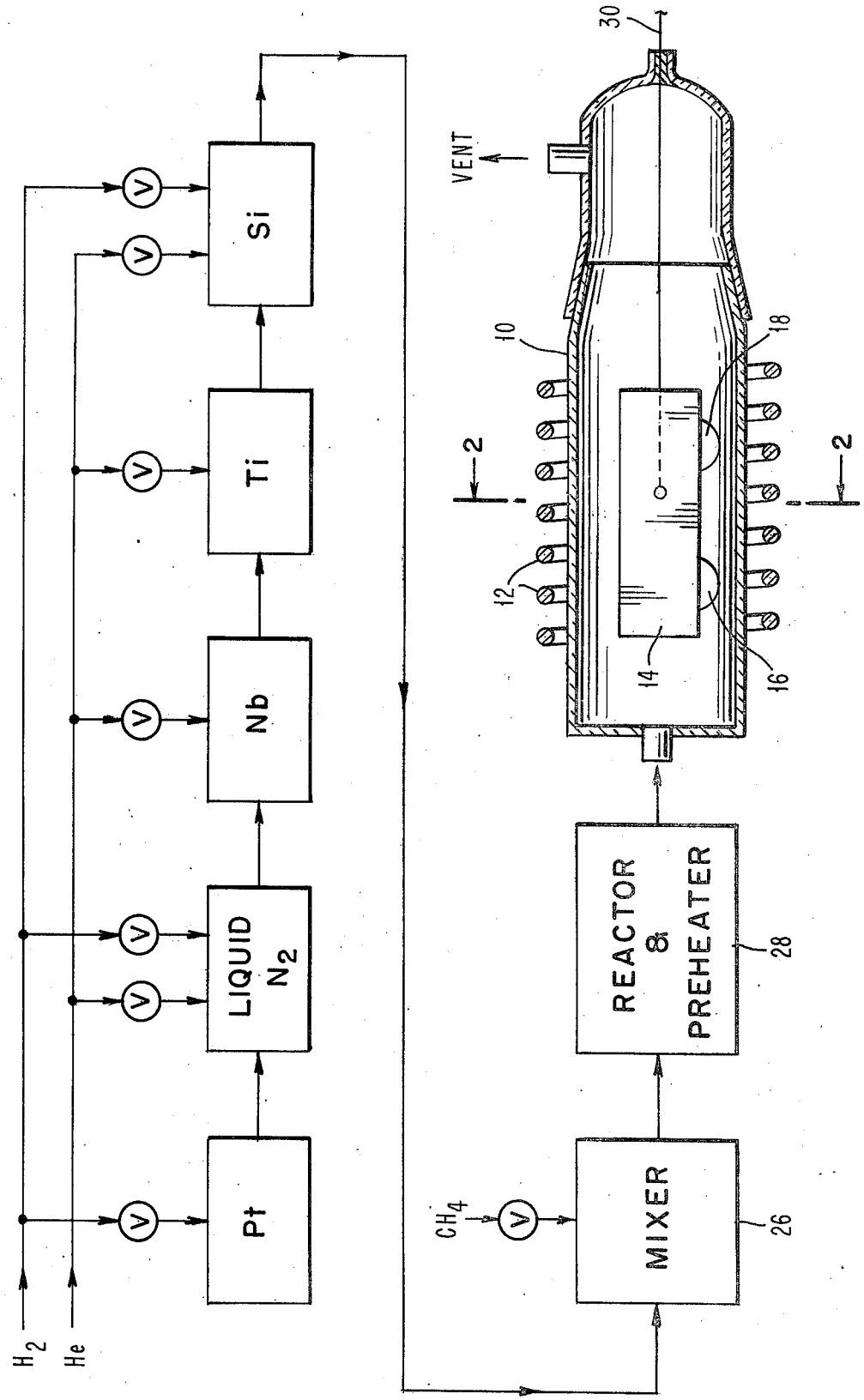
FIG. 1 is a schematic drawing of the susceptor and its reactor and a reactant train.

Prior to admittance into reactor 10, high purity helium is further purified by successively passing it through liquid nitrogen and over heated niobium, titanium and silicon. It is then passed into the mixing chamber as shown in FIG. 1, where it used to further dilute a 6.0% CH$_4$-He mixture. The gas flow is dependent upon both the diameter of the reactor and the size of the susceptor. For example, where the diameter of the reactor is 39 mm and the susceptor size is 6 × 1½ × ¾ inches the flow rate is about 2.5l/min. On the other hand where the diameter of the reactor is 69 mm and the size is 6 × 2½ × 1⅜ inches the flow rate is 9.3 l/min. It should be readily apparent to one skilled in the art that the flow rates can be increased or decreased as the reactor size is made larger or smaller. The gas mixture then enters pre-heater 28 where it is heated by a resistance heated furnace to a temperature of about 600° C. The heated gas mixture is then permitted to enter reactor 10 and then into susceptor 14 where it reacts with the silicon wafer 20. The time allotted for the gas mixture to react with the silicon substrate 20 can vary from about 10 minutes to about 720 minutes depending upon the desired thickness. The growth rate of the films deposited at 1250° C. is about 30Å/min.

In a preferred embodiment silicon wafers are coated with SiC according to the following sequence of steps in the so called two step reaction.

After placing the wafers in the susceptor which has been treated above described. The He ambient surrounding the wafers is heated to a temperature range of about 1200° C. to 1350° C. The preferred temperature is 1250° C. The He has a linear velocity of about 4cm/sec and a flow rate of about 8.1 liters/min. The wafers are allowed to be heated for about 10 minutes whereby the native oxide is removed.

This procedure for removal of native oxide on the silicon surface is preferred to that involving reduction at elevated temperatures in a hydrogen ambient atmosphere, since surface quality is likely to deteriorate using hydrogen reduction techniques. In addition, any reduced SiO$_2$ will leave behind residues of silicon on the surface which are highly undesirable. The temperature is then lowered to about 900° C. in about 20 minutes. CH$_4$ is then admitted into the reactor and susceptor for about 30 minutes during which time the $CH_4$ is cracked to form a C layer on the Si substrate. As indicated above the flow rate of methane and helium will be determined by the size of the reactor and susceptor. The concentration of the $CH_4$ can vary from about $0.8 \times 10^{-3}$ to about $2.4 \times 10^{-3}$ moles/liter of total gas. Preferably the $CH_4$ concentration is about $2.4 \times 10^{-3}$ moles/liter. After the allotted time for C deposition e.g. 30 minutes the methane flow is stopped. The reactor is then heated to a temperature in the range of about 1200° C. to about 1350° C. in a pure He ambient. The preferred temperature is 1250° C. The C layer is reacted with the Si at this temperature for 60 minutes in an helium atmosphere. The reactor is then slowly cooled to room temperature (approximately 2 hours). Under these conditions the growth rate is approximately 20Å/minute. The resultant films are pin hole free.

In another embodiment the silicon wafers are coated with SiC in the so called one step reaction. The Si wafer is first treated at 1250° C. in purified helium, as before, to remove native oxides. The substrate temperature is adjusted to 1200°–1350° C., or in a preferred mode maintained at 1250° C. Methane and helium gases are mixed and introduced to the reactor (methane concentration $0.8–2.4 \times 10^{-3}$ moles/liter, preferred 1.6 moles/liter) for a period of time from 10–720 minutes depending on desired thickness. The growth rate at the preferred concentration is approximately 90Å/minute. After permitting the reaction to continue for the desired time the temperature is reduced to room temperature in about 2 hours time.

The SiC films grown by the above method and in the susceptor of the present invention are smooth, highly dense, adherent and are pin hole free. In both instances the reaction is self limiting in the sense that the reaction process will continue to occur as long as the silicon surface is in contact with carbon or methane gas. This is unlike a film deposition process where no reaction is occurring between the depositing film and the underlying substrate.

What is claimed is:

1. A method for forming smooth, dense highly adherent and pin hole free SiC films on Si substrates comprising the steps of:
   (a) placing said Si substrates in a tantalum susceptor coated with tantalum carbide, said susceptor having the effect of floating within a reactor,
   (b) having said Si substrates at atmosphere pressure in a pure He ambient at a temperature and for a time sufficient to remove native $SiO_2$ from the surfaces of said substrates,
   (c) cooling the substrates to a temperature of about 900° C.
   (d) flowing a preheated $CH_4$/He mixture into said reactor while maintaining said temperature at about 900° C. for a time sufficient to crack methane whereby a coating of C is deposited on said substrates, said $CH_4$ being present in the amount from about $0.8 \times 10^{-3}$ to about $2.4 \times 10^{-3}$ moles/liter of the mixture;
   (e) stopping the flow of $CH_4$ and heating said substrates in a pure He ambient to a temperature and for a time sufficient to form SiC films of desired thickness on said substrates; and thereafter
   (f) slowly cooling said substrates to room temperature.

2. A method according to claim 1 wherein the substrates are heated in step b to a temperature of from about 1200° C. to about 1350° C.

3. A method according to claim 2 wherein the substrates are reheated in step e to a temperature range of from about 1200° C. to about 1350° C.

4. A method according to claim 3 wherein said substrates are heated in step b to a temperature of 1250° C. for about 10 minutes.

5. A method according to claim 4 wherein said substrates are reheated in step e for a period of from 10 min to about 720 min.

6. A method according to claim 5 wherein said substrates are reheated in step e to a temperature of about 1250° C.

7. A method according to claim 6 wherein said $CH_4$ is present in the concentration of about $2.4 \times 10^{-3}$ moles/liter.

8. A method according to claim 7 wherein said substrates are allowed to cool in step f over a period of about 2 hours.

9. A method for forming smooth, dense, highly adherent and pin hole free SiC films on Si substrates comprising the steps of:
   (a) placing said Si substrates in a tantalum susceptor coated with tantalum carbide, said susceptor having the effect of floating within said reactor,
   (b) heating said substrates in a pure He ambients to a temperature and for a time sufficient to remove native $SiO_2$ from the surfaces of said substrates
   (c) flowing a preheated $CH_4$/He mixture into said reactor while maintaining a temperature in the range of about 1200° C. to about 1350° C. and for a time sufficient to form SiC on the surfaces of said substrates, said $CH_4$ being present in the amount from about $0.8 \times 10^{-3}$ to about $2.4 \times 10^{-3}$ moles/liter of the mixture; and thereafter
   (d) slowly cooling said substrates to room temperature.

10. A method according to claim 9 wherein the substrates are heated in step (b) to a temperature in the range of about 1200° C. to 1300° C.

11. A method according to claim 10 wherein said substrates are heated in step (b) to a temperature of about 1250° C.

12. A method according to claim 11 wherein said $CH_4$ is present in the concentration of about $1.6 \times 10^{-3}$ moles/liter.

* * * * *